United States Patent [19]
Beigang

[11] Patent Number: 5,279,402
[45] Date of Patent: Jan. 18, 1994

[54] FREEWHEELING DEVICE FOR FOUR-WHEEL DRIVE VEHICLES

[75] Inventor: Wolfgang Beigang, Ruppichteroth, Fed. Rep. of Germany

[73] Assignee: GKN Automotive AG, Siegburg, Fed. Rep. of Germany

[21] Appl. No.: 971,325

[22] Filed: Nov. 4, 1992

[30] Foreign Application Priority Data

Nov. 4, 1991 [DE] Fed. Rep. of Germany ....... 4136271

[51] Int. Cl.$^5$ ............................................ F16D 43/06
[52] U.S. Cl. ....................................... 192/57; 192/48.6; 192/48.92; 192/71; 192/93 C; 192/103 B; 192/105 B
[58] Field of Search ...... 192/103B, 57, 104.B, 104.C, 105.BB, 105.B, 71, 74, 93.6, 48.6, 48.92, 48.3, 48.8

[56] References Cited

U.S. PATENT DOCUMENTS

| | | | |
|---|---|---|---|
| 1,969,561 | 8/1934 | Keller | 192/48.6 X |
| 2,020,040 | 11/1935 | Rauen | 192/48.6 |
| 2,367,390 | 1/1945 | Firth et al. | 192/93 C |
| 2,429,091 | 10/1947 | Dodge et al. | 192/104 C |
| 2,464,675 | 3/1949 | Dodge | 192/104 C X |
| 2,493,232 | 1/1950 | Dodge | 192/104 C X |
| 2,678,117 | 5/1954 | Birbaum | 192/48.92 X |
| 2,721,639 | 10/1955 | Miller | 192/105 B X |
| 3,757,593 | 9/1973 | Svenson | 192/48.92 X |
| 3,762,519 | 10/1973 | Bentley | 192/105 BB |
| 3,935,749 | 2/1976 | Groves | 192/104 C X |
| 4,460,078 | 7/1984 | Heide et al. | 192/71 X |
| 4,494,637 | 1/1985 | Gotoda et al. | 192/48.6 X |
| 4,860,866 | 8/1989 | Stanek | 192/71 |
| 4,883,152 | 11/1989 | Froment | 192/48.92 X |
| 5,012,907 | 5/1991 | Fujioka et al. | 192/93 C X |
| 5,040,652 | 8/1991 | Fish et al. | 192/71 X |
| 5,085,306 | 2/1992 | Beigang | 192/71 X |
| 5,156,247 | 10/1992 | Wiese et al. | 192/57 X |

FOREIGN PATENT DOCUMENTS

2073338 10/1981 United Kingdom ............. 192/48.92

Primary Examiner—Leslie A. Braun
Assistant Examiner—Andrea Pitts
Attorney, Agent, or Firm—Harness, Dickey & Pierce

[57] ABSTRACT

The invention relates to a freewheeling device 11 in the case of which the outer freewheeling component 14 and the inner freewheeling component 17 are connected in the main torque transmitting direction by locking members 25 which engage apertures 24 of the inner freewheeling component 17 and recesses 26 of the outer freewheeling component 14 and which permit one of the freewheeling components 14 to be overtaken by the other freewheeling component 17 when a certain speed is exceeded. If the speed is below the specified speed, an additional switching element is released via a speed-dependent switching device 29, so that the switching element 30, under the influence of a spring 36, is transferred into a position where it supports the locking member 25 to prevent them from escaping radially inwardly, thereby cancelling the freewheeling function. Thus, at low speeds, torques may be transmitted in both directions of rotation via the freewheeling device 11, whereas the freewheeling function is ensured at higher speeds.

13 Claims, 8 Drawing Sheets

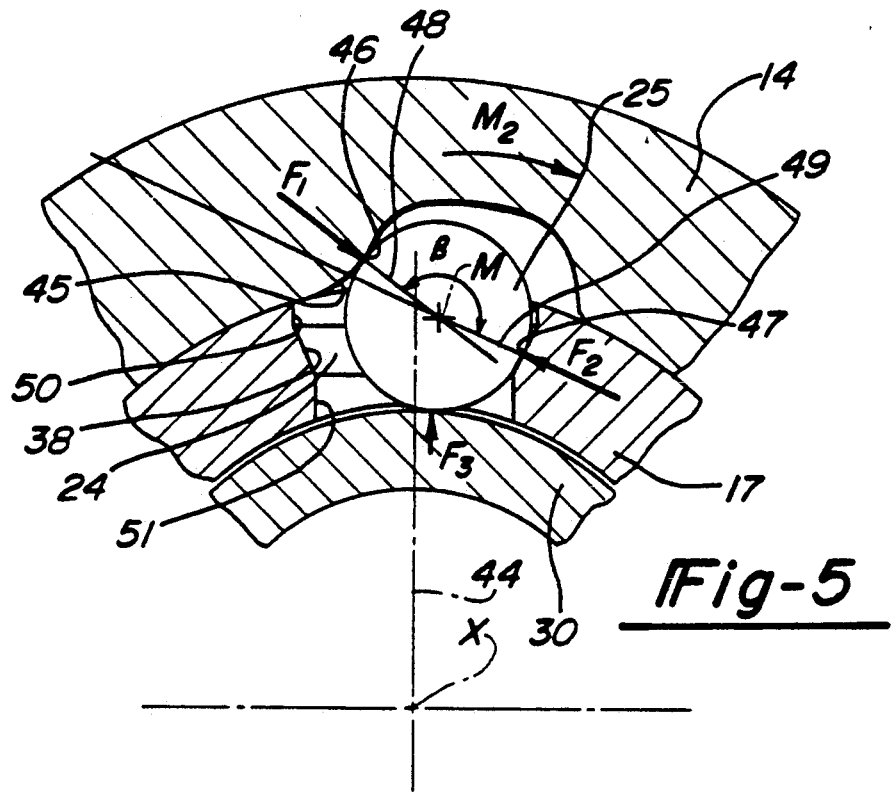
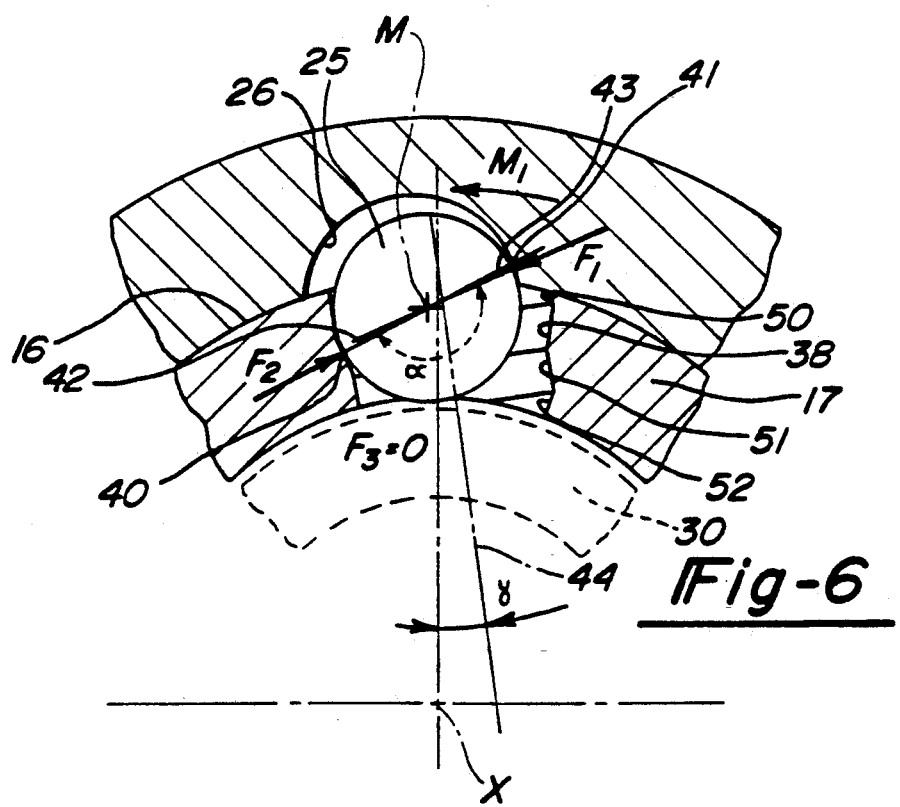

FREEWHEELING DEVICE FOR FOUR-WHEEL DRIVE VEHICLES

BACKGROUND OF THE INVENTION

The invention relates to a lockable freewheeling device, and more particularly for connecting the drive of the wheels of the axle not permanently driven to the drive of the wheels of the permanently driven axle of a motor vehicle. The freewheeling device includes two freewheeling components one of which is driven with the other one being intended to pass on the rotational movement and which two components are non-rotatingly connected to one another via a switching device operated especially by a centrifugal force, up to a predetermined speed for both possible directions of rotation and, for any speeds in excess of said predetermined speed, only for a main driving direction of rotation.

A drive assembly for a four-wheel drive motor vehicle with a viscous coupling, which, via a freewheeling device, is connected to the input and for the wheels not driven permanently or is disconnected therefrom is described in U.S. Pat. No. 4,889,353. Described in that reference are two freewheeling units with clamping members, which units engage up to a predetermined speed, thus producing a non-rotating connection for both directions of rotation. From a certain speed upwards, the clamping members of the freewheeling unit which serve to transmit torque during reversing are made inoperative. This ensures that in case the rear wheels rotate faster than the front wheels, for example during braking, overtaking becomes possible. This ensures that no braking torque is transmitted by the front wheels to the rear wheels and that, even if the front wheels are overbraked, the lateral stability of the vehicle is maintained. This also ensures that at high speeds, the lateral stability of the vehicle is maintained.

However, a disadvantage of this design is that the clamping members are used directly as centrifugal weights for the movement into the open position. This means that at the slightest twisting moment (e.g. through worn rear tires), an accurate transfer into the free position is not possible.

Viscous couplings for connecting the motor vehicle wheels not driven permanently are known. Great Britain Patent Number 1,357,106 describes a system wherein the viscous coupling is arranged between the front wheels and rear wheels. The viscous coupling reacts to a speed differential between the front wheels and rear wheels. This reference also shows viscous couplings as so-called torque splitters, in which case they replace the rear wheel differential of the axle of a four-wheel drive vehicle not driven permanently. Such an assembly is known from DE 37 08 193 A1 for example. This publication also describes freewheeling units which, during driving, permanently have a locking effect in both directions of rotation, but which are released when the vehicle brake is actuated.

It is an object of the invention to provide a freewheeling device which is suitable for securely transmitting the torque in the main torque transmitting direction and which, above a certain speed level, ensures accurate disconnection when the torque operating direction is reversed while permitting the transmission of torque in both directions of rotation at low speeds, independently of the torque operating direction.

In accordance with the invention, a freewheeling device is described wherein one of the freewheeling components comprises a sleeve-shaped portion with circumferentially distributed apertures holding locking members in a radially diplaceable way. The other freewheeling component is provided with recesses circumferentially distributed so as to correspond to the recesses. The apertures and recesses comprise opposed supporting faces for the main torque transmitting direction on the one hand and for an opposite torque operating direction on the other hand. The supporting faces for the main torque transmitting direction are arranged in such a way that the normal lines relative to the contact faces, in the contact points with the locking members designed as rolling members, which extend through the center of the locking members, form a maximum angle of 185° directed towards the rotational axis of the freewheeling components. The supporting faces for the opposite torque operating direction are arranged in such a way that the normal lines in the contact points with the locking members form a maximum angle of 180° facing away from the rotational axis. In the sleeve-shaped portion there is provided a switching element which is axially displaceable, which, by a spring, is pushed into a position in which the locking members are held so as to be prevented from escaping in the direction of the rotational axis and which, as a function of the speed, may be moved into a releasing position via a switching device.

An advantage of this design is that if, at higher speeds, e.g. in excess of a forward speed of 25–40 km per hour depending on the type of vehicle, a transfer into the freewheeling function takes place when the torque operating direction is reversed.

Below the limit speed, the switching element ensures secure support so that during reversing, which, with respect to the torque operating direction, takes place in the direction opposite to the main torque transmitting direction, the locking members are securely supported so the four-wheel drive also functions during reversing.

According to a further embodiment of the invention, in the main torque transmitting direction, when a predetermined speed is exceeded, the locking members are held entirely by the inertia forces acting on them.

In a preferred embodiment, the supporting face for the main torque transmitting direction, with reference to the apertures, is formed by a conical face of a conical bore whose vertex is arranged on the radial inside of the sleeve-shaped portion towards the rotational axis.

According to an alternate embodiment, the axis of the conical bore extends radially relative to the rotational axis.

Alternatively, in the alternate embodiment, the axis of the conical bore is inclined and—if viewed in section—intersects the rotational axis, the distance between the axis and the rotational axis being predetermined.

For the alternate embodiment, the angle formed by the supporting face of the recess for the main torque transmitting direction with the bore axis of the conical bore may be smaller than that formed by the supporting face with the bore axis for the opposite torque operating direction.

A supporting element for tho locking members should be axially movably guided in the sleeve-shaped portion of the associated freewheeling component. For securing the position of the switching element, there should be provided securing balls which are pushed into a securing recess by the supporting element and which axially hold the switching element. The supporting faces are designed so as to be tapered towards the closing direction of the switching element.

The additional supporting element, together with the securing balls, serves to reduce the actuating force required for transferring the locking members into the freewheeling position when the driveline is twisted.

In a further embodiment, the switching element is also designed as a sleeve and the freewheeling component comprising the apertures comprises a hollow projection for providing a non-rotating connection with the journal.

Preferably, at least one of the two freewheeling components is designed as a connecting part of a joint or a shaft, as a result of which integration into the driveline is facilitated.

The freewheeling device is particularly advantageous if it cooperates with one or a plurality of viscous couplings, with the viscous coupling and freewheeling device being connected in series.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments of the invention are diagrammatically illustrated in, and explained in greater detail with reference to, the drawings.

FIG. 5 illustrates the detail Z referring to the embodiment to FIG. 4, with the torque operating in the opposite direction (reversing) to the main torque transmitting direction.

FIG. 6 illustrates an alternate embodiment according to FIG. 4.

DETAILED DESCRIPTION OF THE PREFERRED EMBODIMENTS

Figure 1:
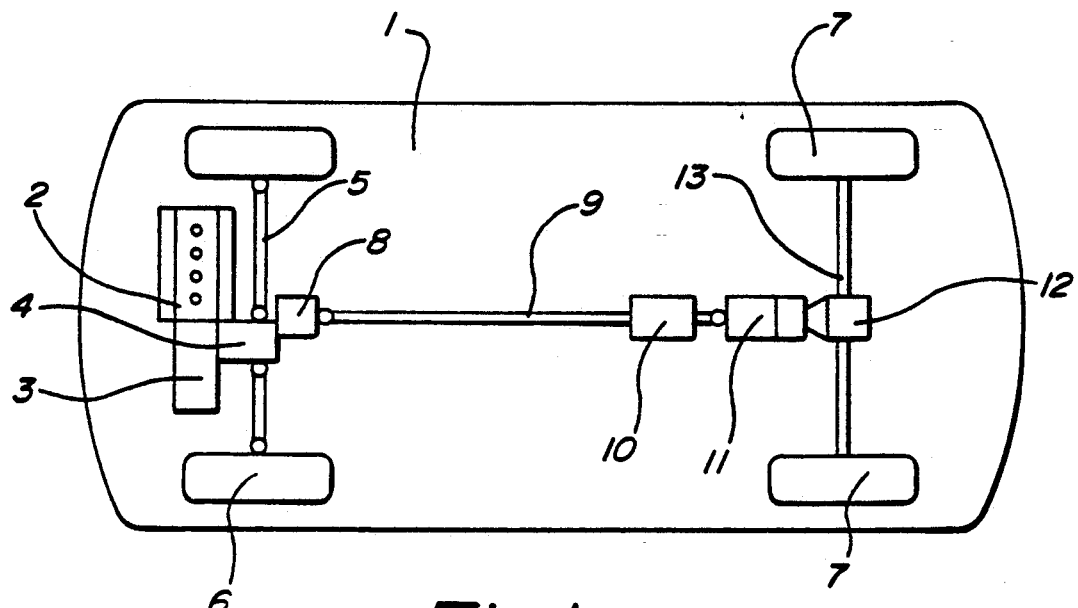
FIG. 1 illustrates a drive concept of a four-wheel drive vehicle provided with a freewheeling device in accordance with the invention.

FIG. 1 shows the motor vehicle 1. The engine 2 via the gearbox 3 serves to drive the motor vehicle 1 by driving the front axle differential 4, and by the front wheel driveshafts 5 the front wheels 6. As far as the basic concept is concerned, the vehicle is a front wheel drive vehicle. The drive for the rear wheels 7 is branched off from the drive of the front wheels 6. The distributing gear 8 is provided for branching off the rotational driving movement. It drives the propeller shaft 9. The driveline of the propeller shaft 9 includes the viscous coupling 10 which is connected to the one end of the freewheeling device 11. The freewheeling device 11 drives the input end of the rear axle differential 12, which, via the rear wheel driveshafts 13, drives the rear wheels 7 of the vehicle 1. In the subsequent FIGS. 2 to 12, the freewheeling device 11 is illustrated in greater detail.

Figure 2:
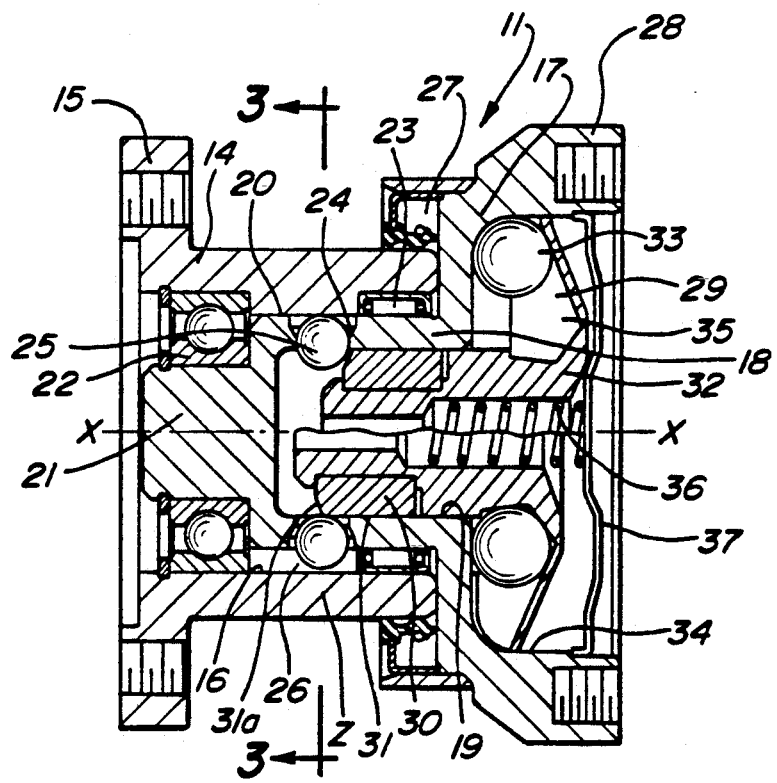
FIG. 2 illustrates a longitudinal section through an embodiment of a freewheeling device.
Figure 3:
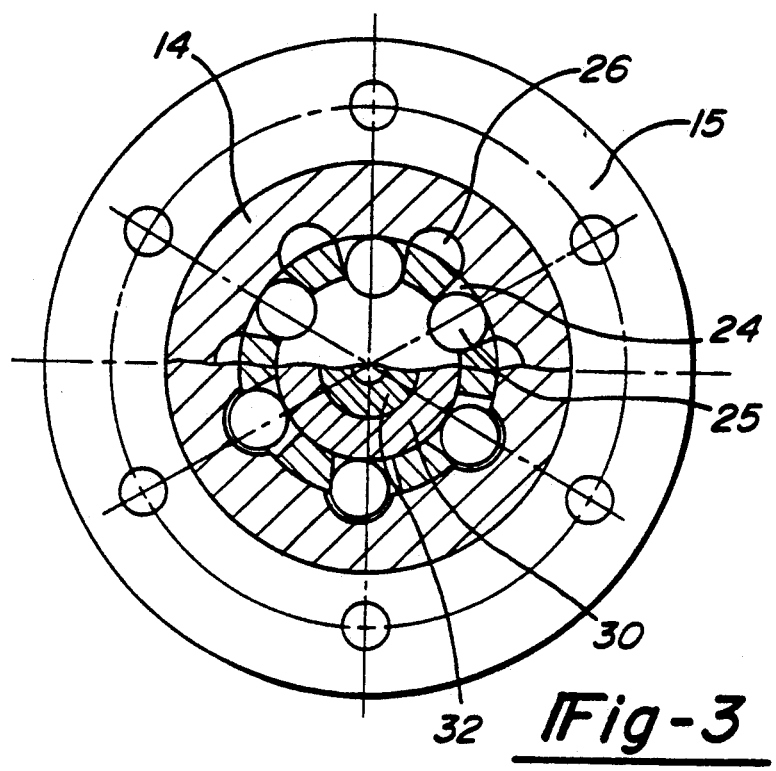
FIG. 3 illustrates a cross-section (along line A—A of FIG. 2) of an embodiment of the freewheeling device.

The freewheeling device 11 according to FIGS. 2 and 3 comprises the outer freewheeling component 14 provided with a flange 15 for connecting it to the output end of the viscous coupling 10 for example. The bore 16 of the outer freewheeling component 14 rotatably accommodates the inner freewheeling component 17. The outer face 20 of its sleeve-shaped portion 18 faces bore 16. The sleeve-shaped portion 18 comprises a bore 19. Furthermore, the sleeve-shaped portion 18 includes a journal 21. On the journal 21 there is arranged the bearing 22 whose outer bearing ring is accommodated in a corresponding bearing bore of the outer freewheeling component 14. The bearing 22 is designed as a deep groove ball bearing. At a distance from the deep groove ball bearing 22, a needle bearing 23 is arranged on the outer face 20 of the sleeve-shaped portion 18; it is also received in a bearing bore of the outer freewheeling component 14.

The outer freewheeling component 14 and the inner freewheeling component 17 are sealed relative to one another by a seal 27.

The inner freewheeling component 17 is provided with circumferentially distributed apertures 24 which, in a radially movable way, accommodate locking members 25 in the form of balls. The locking members 25 engage recesses 26 of the outer freewheeling component 14 which are distributed in accordance with the distribution of the apertures 24.

The shape of the apertures 24 and recesses 26 and their effects are described in greater detail with reference to FIGS. 3 to 8.

At its end projecting from the outer freewheeling component, the inner freewheeling component 17 comprises a formation in the form of a flange 28 which is used, for example, for being connected to the input end of the rear axle differential 12 according to FIG. 1.

Furthermore, there is provided a switching device 29 which serves to actuate a switching element 30. With its outer face 31, the switching element 30 is movably accommodated in the bore 19 of the sleeve-shaped portion 18. The switching element 30 comprises an inclined face 31a which acts on the locking members 25 in the sense of moving them radially outwardly. The switching element 30 is accommodated in a carrier 32 loaded by a spring 36 which pushes the switching element according to FIG. 2 into a position displaced towards the left. This position is illustrated in the lower half of the longitudinal section. The outer face 31 of the switching element 30 supports the locking members 25 so that these are held so as to be enclosed in the apertures 24 and the associated recesses 26. The switching element portion prevents movement of the locking members inwardly.

The upper half of FIG. 2 shows the open position of the freewheeling device 11. To move the switching element 30 into the position shown in the upper half of FIG. 2 there are provided centrifugal masses 33 held in the guiding tracks 35 of the carrier 32. The guiding tracks 35 are inclined so that when moving the centrifugal masses 33 radially outwardly in the guiding tracks 35 and radially outwardly at the radial face of the hollow space 34, an axial force is applied to the carrier 32 to move the switching element 30 back and out of contact with the locking members 25. The switching device 29 is accommodated in the hollow space 34 of the inner freewheeling component 17.

Towards the outside, the hollow space 34 is sealed by the cover 37 which simultaneously serves as a supporting base of the spring 36.

Figure 4:
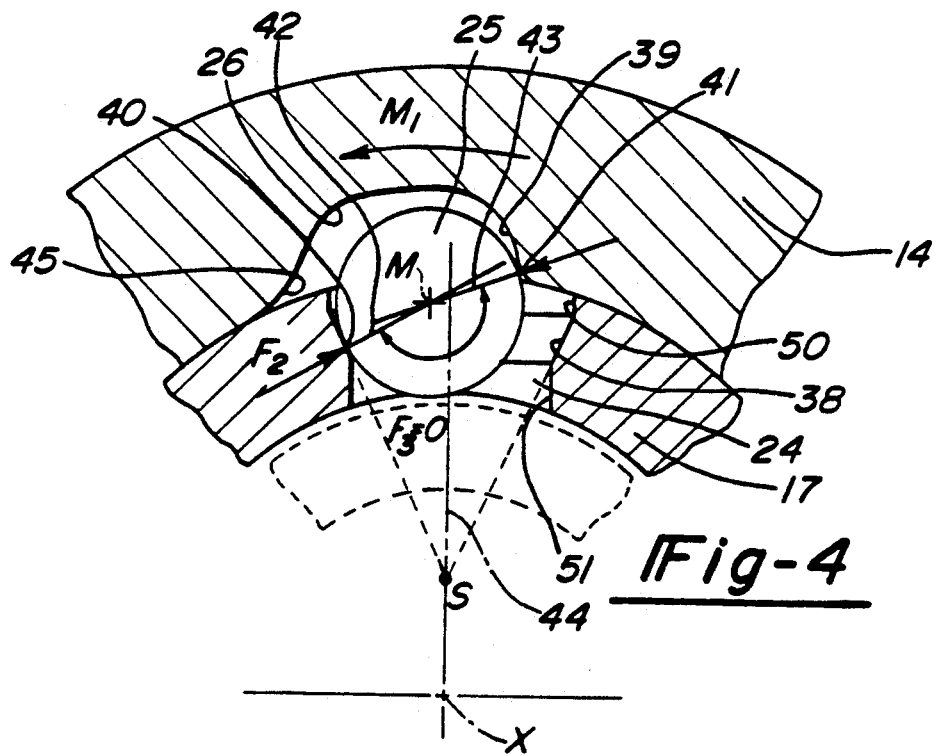
FIG. 4 illustrates the detail Z according to FIG. 2 in an enlarged scale with reference to a first embodiment, with positions as taken up in the main torque transmitting direction (forward driving).

FIG. 4, in the form of a detail and in an enlarged scale, shows the design of the aperture 24 and the associated recess 26. The locking member 25 designed as a ball is shown in the main torque transmitting position, with torque being transmitted in direction M1. This position corresponds to the vehicle driving forwards in accordance with FIG. 1. The aperture 24 comprises a supporting face designed as a conical bore 38. The vertex of the cone of the conical bore has been given the reference symbol S and is arranged inside the hollow space of the inner freewheeling component 17 towards the rotational axis X—X. This arrangement corresponds to a rotational driving direction of the driving outer freewheeling component 14 in the direction M1 of the arrow. The locking member 25, via the contact point 41, rests against the relatively steep flank of the supporting face 39. Furthermore, via the contact point 40, the locking member 25 is supported on the opposite supporting face formed by the conical bore 38, with the effective lines of the force F1 and those of the respective supporting force F2 being arranged at an angle $\alpha$. The angle $\alpha$ opens towards the rotational axis X—X and its maximum value is 185°. Its legs are formed by the normal lines 42 at the contact point 40 of the supporting face of the conical bore 38 extending through the center M of the locking member 25 and by the normal line 4 which starts from the contact point 41 and which also extends through the center M. This ensures sufficient support for holding the locking members 25 in the torque transmitting position. The same supporting conditions are obtained in the case of a low speed because then, as described in connection with FIG. 2, the switching element 30 radially supports the locking members 25, with the vehicle driving forwards at a low speed. For this reason, in this driving condition, the switching element 30 is shown in a broken line.

In the case of reversing, the contact conditions are reversed. As the change-over to reversing results in a low speed, the switching element 30 is displaced into the position illustrated in the lower halves of FIGS. 2 and 3 because the inertia forces acting on the centrifugal masses 33 are not sufficient for displacing the switching element 30 against the force of the spring 36, i.e. at said speed, the spring 36 moves the switching element into the above-described position. This means that the locking member 25 is supported on the radial inside. It rests against the outer face 31 of the switching element 30. In the process, the contact conditions change in respect of the supporting faces during reversing. Now, as can be seen in FIG. 5, when the outer freewheeling component 14 is driven in the torque operating direction M2, the supporting face 45 designed as a radius face, with its contact point 46, is supported on the locking member 25 which, in turn, is supported on the contact point 47 on the bore designed as a conical face 38, the forces F1 and F2 being arranged at an angle $\beta$ which points away from the rotational axis X and amounts to a maximum value of 180°. The vertex of the angle 2 is formed by the center M of the locking member 25. The normal line at the contact point 46 through the center M is given the reference number 48. The normal line 49 extends from the contact point 47 through the center M of the locking member 25. As a result, there occurs an inwardly directed radial force resulting from the forces F1 and F2 arranged at the angle $\beta$. Said radial force has to be accommodated by a corresponding supporting force F3 acting in the opposite direction and generated by the switching element 30.

The contact conditions as shown in FIG. 5 also occur under overrun conditions so that, when the limit speed is exceeded, i.e. when the locking members 25 are not supported via the switching element 30, the inwardly directed radial force resulting from the forces F1 and F2 transfers the locking members 25 inwardly from their condition of contact with the supporting faces 45. As a result, it is possible, under driving conditions, for the rear wheels of the vehicle to rotate faster than the front wheels, which, in turn, causes the inner freewheeling component 17 to rotate faster than the outer freewheeling component 14, which is made possible by transferring the locking members 25 into the radially inner freewheeling position.

In the case of the embodiment according to FIGS. 4 and 5 the axis of the conical bore 38 extends radially relative to the rotational axis X. The bore axis has been given the reference number 44. The conical bore 38 is followed at both ends by cylindrical bore portions 50 and 51.

Figure 7:
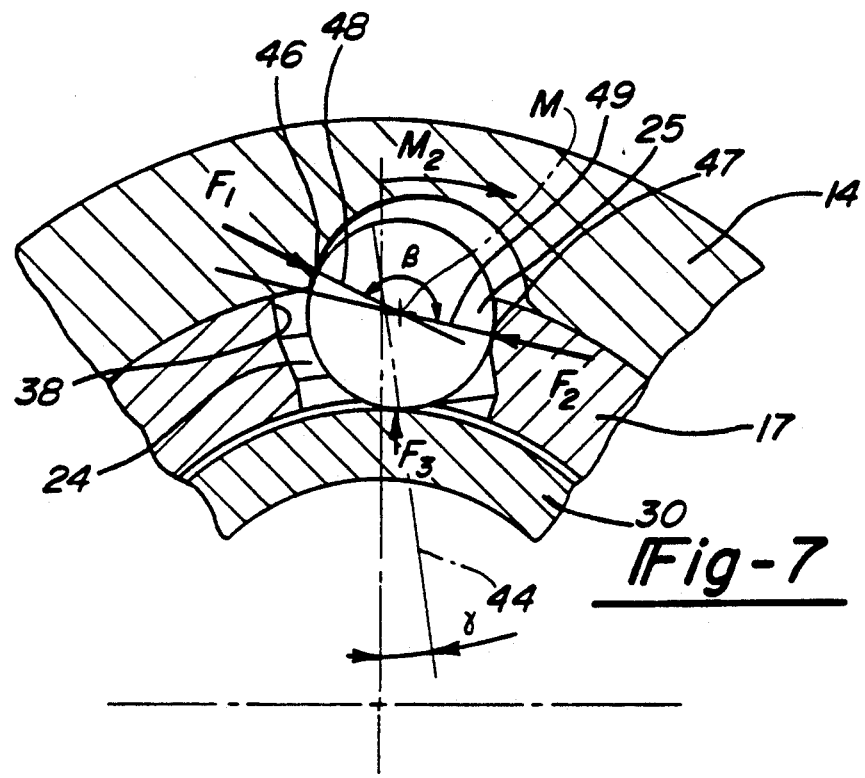
FIG. 7 illustrates the embodiment according to FIG. 6 in the manner shown in FIG. 5.
Figure 8:
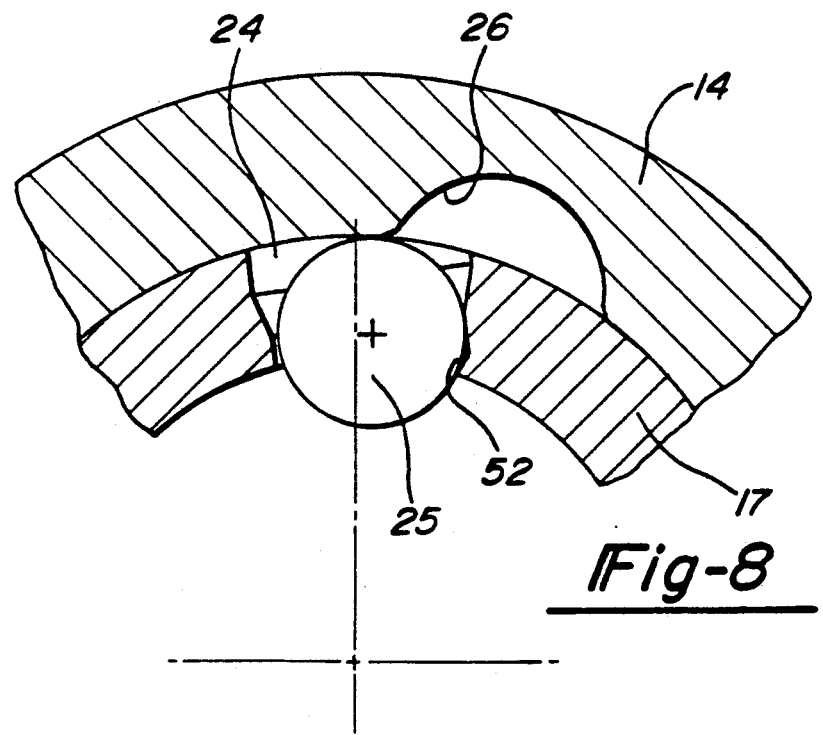
FIG. 8 illustrates an embodiment of the freewheeling device in the freewheeling position.

The embodiment according to FIGS. 6 to 8 constitutes a variant of the embodiment to FIGS. 4 and 5. A difference is that the bore axis 44 of the conical bore 38 is inclined and, if viewed in cross-section, extends in such a way that it intersects the rotational axis X so that there exists a distance between the bore axis 44 and the rotational axis X. Furthermore, the recess 26 is designed differently. Its flanks are symmetric and preferably designed as portions of a circle which, via a chamfer, change into the wall of the bore 16 of the outer freewheeling component 14. Furthermore, the inner cylindrical bore portion 51 is followed by a conical bore portion 52 which ensures that the locking member 25 cannot fall inwardly into the hollow space of the inner freewheeling component 17. FIG. 7 shows the positions of the two freewheeling components 14, 17 relative to one another and relative to the locking member 25 during reversing, as described in connection with FIG. 5.

FIG. 8, additionally, shows the freewheeling position in the case of which the two freewheeling components 14, 17 are turned relative to one another and where the locking member 25 has escaped radially inwardly, but is held by the conical face 52 to prevent it from falling inwardly.

Figure 9:
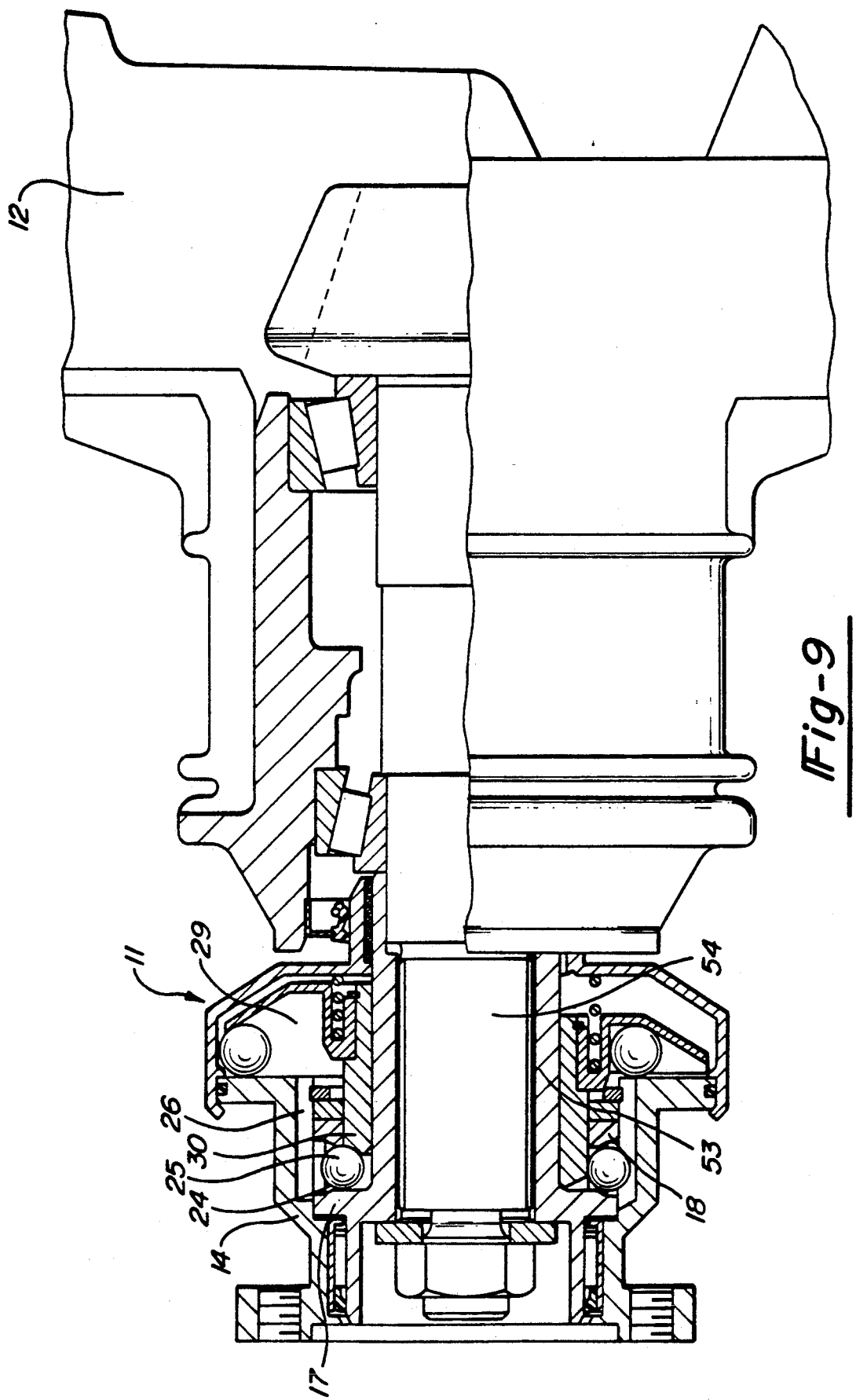
FIG. 9 illustrates an embodiment of the freewheeling device slipped on to the input journal of a rear axle differential.

FIG. 9 shows a variant of the design of the freewheeling unit 11 as compared to the embodiment shown in FIGS. 2 and 3. With the embodiment according to FIG. 9, the freewheeling unit 11 comprises an inner freewheeling component 17 which, in addition, is provided with a projection 53 arranged at a parallel distance from the sleeve-shaped portion 18 and passing through the switching element 30 which is also hollow. The bore of the projection 53 is provided with teeth by means of which the freewheeling component 17 is accommodated in corresponding teeth of a journal 54. This journal 54 may, for example, constitute the driving journal of the rear axle differential 12 which is connected to a bevel gear which serves to drive the crown wheel of the rear axle differential.

Figure 10:
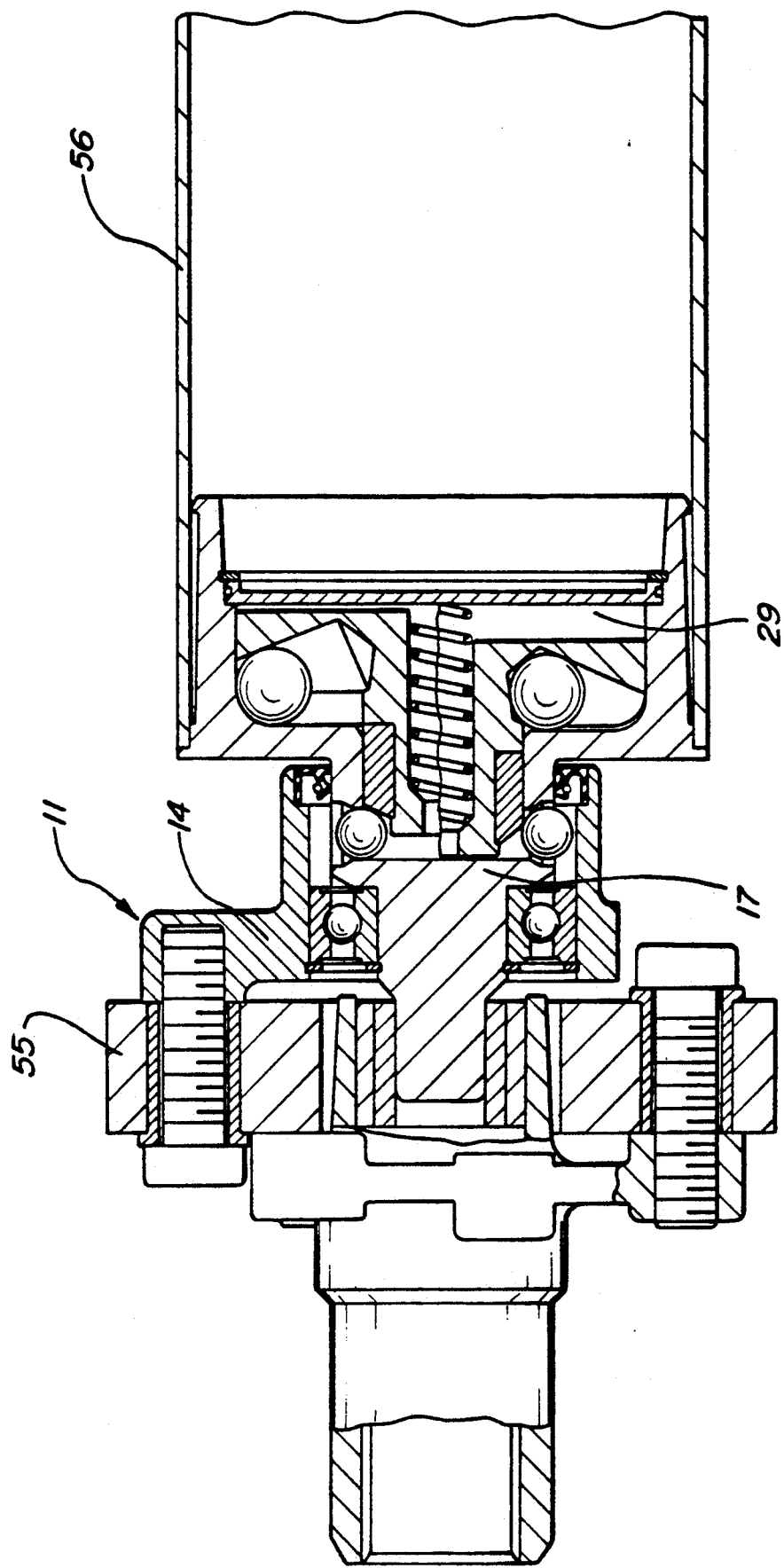
FIG. 10 illustrates the freewheeling device associated with a propeller shaft.

FIG. 10 shows a further variant regarding the way in which the freewheeling device 11 is arranged and associated with other components. With the embodiment according to FIG. 10, the freewheeling unit 11 forms part of a driveshaft, the outer freewheeling component 14 and more particularly its flange being connected to a joint disc 55, whereas the inner freewheeling component 17 is designed as a connecting part secured to a tube designed as a shaft 56.

Figure 11:
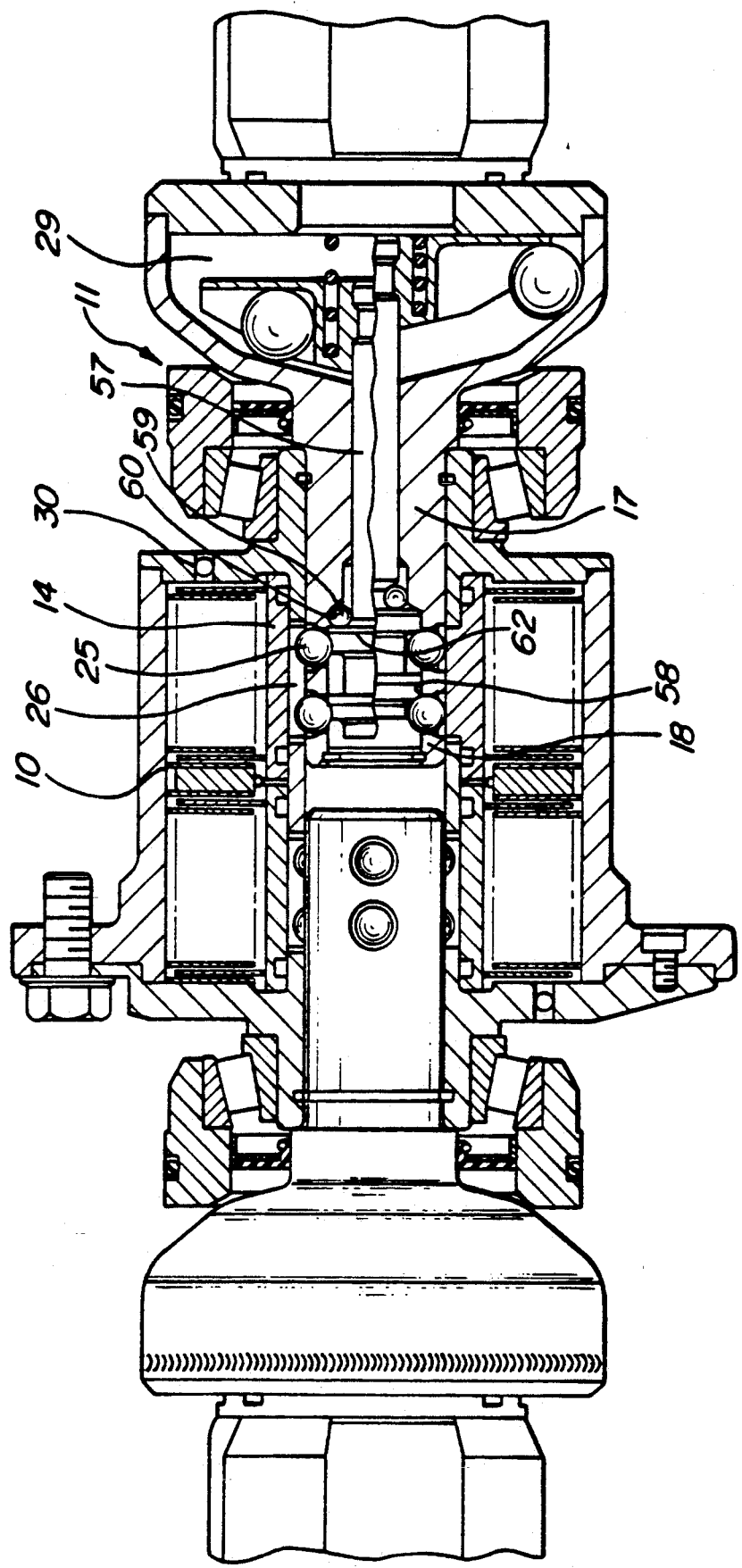
FIG. 11 illustrates the freewheeling device associated with a viscous coupling in place of a rear axle differential.
Figure 12:
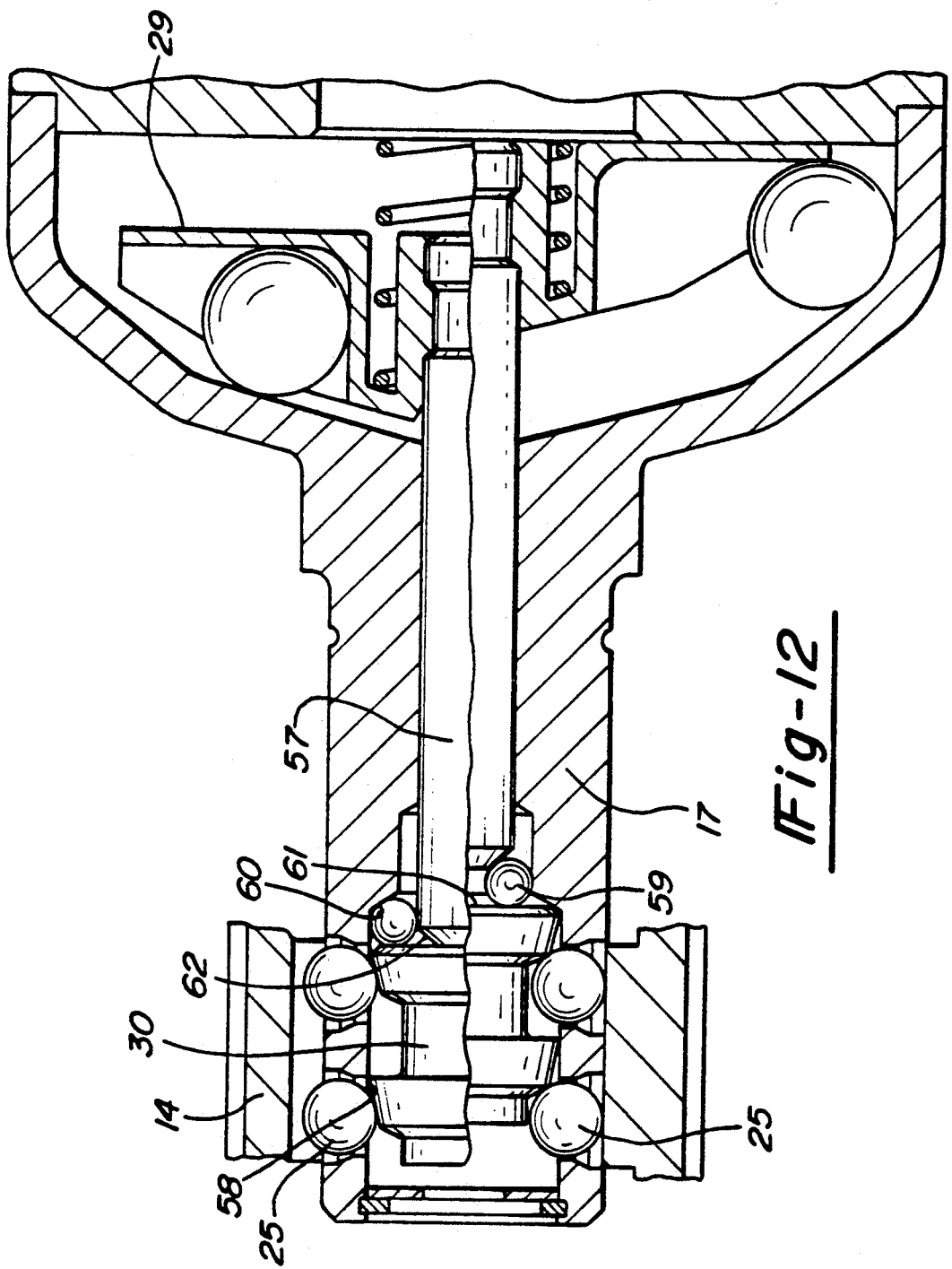
FIG. 12 in an enlarged scale, shows the mode of operation of the locking members for the embodiment according to FIG. 11.

FIGS. 11 and 12 show a variant regarding the way in which the freewheeling device 11 is arranged and associated with other components. FIG. 11 illustrates a so-called torque splitter intended to replace the rear axle differential 12 as illustrated in FIG. 1. The viscous coupling 10 consists of two viscous couplings arranged side by side and contained in a joint housing. However, their hubs are separated and used to drive one of the two rear wheels 7. The hubs of the two viscous couplings at the same time constitute the outer freewheeling component 14. The inner freewheeling component 17 is extended and serves to connect a rear wheel driveshaft.

In the inner freewheeling component 17 there is arranged a supporting element 57 which is separated from the switching element 30 and which comprises a supporting face 58 for the locking members 25. The supporting face 58 is inclined and formed by a conical face. In respect of its design and length it is sufficient to push the supporting element to the right via the locking members 25 under overrun conditions when the predetermined limit speed is exceeded and when the switching element does not cause the supporting element 57 to be locked.

The switching element is designed as a kind of bar and comprises a guiding face 62 which acts on securing balls 59 and ensures that the supporting element 57 is moved from the position displaced towards the right as illustrated in the lower half of FIG. 11 into the position as illustrated in the upper half of FIG. 11. As a result, the securing balls 59 are able, at the same time, to move radially outwardly into the recess 60 via the guiding face 62 and subsequently, by supporting themselves on the outer face of the switching element 30 and against the end face 61 of the supporting element 57, lock it against displacement while holding the locking members 25 to ensure that they engage the recesses 26.

While the above detailed description describes the preferred embodiment of the present invention, the invention is susceptible to modification, variation, and alteration without deviating from the scope and fair meaning of the subjoined claims.

I claim:

1. A lockable freewheeling device for connecting the drive of wheels of an axle not permanently driven to the drive of wheels of a permanently driven axle of a motor vehicle comprising:

first freewheeling component having a sleeve shaped portion and a rotational axis;

circumferentially distributed apertures in said sleeve shaped portion;

second freewheeling component for rotation about said rotational axis having circumferentially distributed recesses corresponding with said circumferentially distributed apertures;

said apertures and recesses comprising opposed supporting faces in a main torque transmitting direction and a secondary torque transmitting direction;

radially displaceable locking members for transmitting torque between said first and second freewheeling components at contact points with said supporting faces;

said opposed supporting faces for the main torque transmitting direction being arranged in such a way that normal lines relative to said supporting faces in the contact points with said locking members form an angle no greater than 185° directed toward said rotational axis and said supporting faces for the secondary torque transmitting direction being arranged in such a way that normal lines in the contact points with said locking member form an angle no greater than 180° facing away from said rotational axis of said first and second freewheeling components;

axially displaceable switching element for selectively holding said locking members in engagement with said contact faces against movement in direction of said rotational axis; and switching device which operates as a function of rotational speed of said first and second freewheeling components to disengage said switch element from engagement with said locking members.

2. A freewheeling device according to claim 1 wherein in the main torque transmitting direction, the locking members are held entirely by inertia forces acting on them, when a predetermined speed is exceeded.

3. A freewheeling device according to claim 1 wherein said supporting faces further comprise a conical face of a conical bore whose vertex is placed towards said rotational axis.

4. A freewheeling device according to claim 2 wherein said supporting faces further comprise a conical face of a conical bore whose vertex is placed towards said rotational axis.

5. A freewheeling device according to claim 3 wherein said supporting faces further comprise cylindrical bores on either side of said conical bore.

6. A freewheeling device according to claim 3 wherein an axis of said conical bore extends radially relative to said rotational axis.

7. A freewheeling device according to claim 3 wherein the angle formed by the supporting face of said apertures for said main torque transmitting direction with an axis of said conical bore is smaller than the angle formed by said supporting face of said recesses for the secondary torque transmitting direction with the axis of said conical bore.

8. A freewheeling device according to claim 3 wherein axis of said conical bore viewed in longitudinal section intersects said rotational axis and when viewed in transverse section is radially offset a preset distance relative to said rotational axis.

9. A freewheeling device according to claim 1 further comprising:

supporting element axially movable in said sleeve shaped portion of said first freewheeling component;

said switching component further comprising securing balls operably associatable with a securing recess in said first freewheeling component by said supporting element for axially securing said switching element;

said switching element further comprising supporting faces tapered towards the engaging direction of said switching element.

10. A freewheeling device according to claim 1 wherein said switching element further comprises a sleeve; and said first freewheeling further comprises a hollow projection for non rotating cooperation with a journal.

11. A freewheeling device according to claim 1 wherein at least one of said first and second freewheeling components further comprise a connecting portion of a drive joint.

12. A freewheeling device according to claim 1 wherein at least one of said first and second freewheeling components further comprise connecting portion of a driveshaft.

13. A freewheeling device according to claim 1 wherein said freewheeling device is operably connected in series to at least one viscous coupling.

* * * * *